United States Patent
Lightstone

(10) Patent No.: US 9,677,928 B2
(45) Date of Patent: Jun. 13, 2017

(54) METHOD, DEVICE AND SYSTEM FOR FITNESS TRACKING

(71) Applicant: Samuel Lightstone, New York, NY (US)

(72) Inventor: Samuel Lightstone, New York, NY (US)

( * ) Notice: Subject to any disclaimer, the term of this patent is extended or adjusted under 35 U.S.C. 154(b) by 0 days.

(21) Appl. No.: 15/138,950

(22) Filed: Apr. 26, 2016

(65) Prior Publication Data

US 2016/0313174 A1    Oct. 27, 2016

Related U.S. Application Data

(60) Provisional application No. 62/152,889, filed on Apr. 26, 2015.

(51) Int. Cl.
G01G 19/50 (2006.01)
A43B 3/00 (2006.01)
A43B 17/00 (2006.01)

(52) U.S. Cl.
CPC ........... *G01G 19/50* (2013.01); *A43B 3/0005* (2013.01); *A43B 17/006* (2013.01)

(58) Field of Classification Search
CPC ...................................... G01G 19/50
USPC ............................................. 702/173
See application file for complete search history.

(56) References Cited

U.S. PATENT DOCUMENTS

| | | | |
|---|---|---|---|
| 3,889,121 A | 6/1975 | Bossen | |
| 4,905,383 A | 3/1990 | Beckett et al. | |
| 5,323,650 A | 6/1994 | Fullen et al. | |
| 5,678,448 A | 10/1997 | Fullen et al. | |
| 5,805,467 A | 9/1998 | Richards | |
| 6,006,602 A | 12/1999 | Preston et al. | |
| 6,122,846 A | 9/2000 | Gray et al. | |
| 6,216,545 B1 | 4/2001 | Taylor | |
| 6,219,625 B1 | 4/2001 | Singh | |
| 6,273,863 B1 | 8/2001 | Avni et al. | |
| 6,807,869 B2 | 10/2004 | Farringdon et al. | |
| 7,353,137 B2 | 4/2008 | Vock et al. | |

(Continued)

FOREIGN PATENT DOCUMENTS

| | | |
|---|---|---|
| KR | 10-1124292 | 2/2012 |
| WO | WO 95/14430 | 6/1995 |

(Continued)

OTHER PUBLICATIONS

International Searching Authority, International Search Report mailed Jul. 26, 2016.

*Primary Examiner* — Ricky Ngon
(74) *Attorney, Agent, or Firm* — Pearl Cohen Zedek Latzer Baratz LLP

(57) ABSTRACT

A system, device and method for fitness tracking include one or more insoles, the one or more insoles having embedded therein a plurality of sensors; a computer having a processor and memory; and one or more code sets stored in the memory and executing by the processor, which, when executed, configure the processor to: receive, as inputs, data collected from the plurality of sensors embedded in the one or more insoles; filter the data; execute an evolutionary algorithm on the data, wherein the evolutionary algorithm converges the data from the plurality of sensors; and determine, based on the converged data, a total weight applied to the one or more insoles.

17 Claims, 8 Drawing Sheets

(56) References Cited

U.S. PATENT DOCUMENTS

| | | |
|---|---|---|
| 8,253,586 B1 | 8/2012 | Matak |
| 8,676,541 B2 | 3/2014 | Schrock et al. |
| 2003/0009308 A1 | 1/2003 | Kirtley |
| 2003/0097878 A1* | 5/2003 | Farringdon .......... A61B 5/1038 73/819 |
| 2006/0143645 A1 | 6/2006 | Vock et al. |
| 2006/0282017 A1* | 12/2006 | Avni .................... A61B 5/1036 600/587 |
| 2008/0244500 A1 | 10/2008 | Solomon |
| 2010/0076692 A1* | 3/2010 | Vock .................... A43B 3/0005 702/19 |
| 2010/0211355 A1* | 8/2010 | Horst ................... A61B 5/1038 702/173 |
| 2011/0054359 A1* | 3/2011 | Sazonov ............. A43B 3/0005 600/595 |
| 2011/0275939 A1 | 11/2011 | Walsh et al. |
| 2012/0323501 A1 | 12/2012 | Sarrafzadeh et al. |
| 2013/0019694 A1* | 1/2013 | Molyneux ............ A43B 3/0005 73/862.381 |
| 2013/0171599 A1* | 7/2013 | Bleich ................. A61B 5/0456 434/247 |
| 2014/0174205 A1 | 6/2014 | Clarke et al. |
| 2014/0200834 A1 | 7/2014 | Ross |
| 2015/0168238 A1* | 6/2015 | Raut .................... G01N 27/048 702/42 |

FOREIGN PATENT DOCUMENTS

| WO | WO 2014/147379 | 9/2014 |
|---|---|---|
| WO | WO 2015/048573 | 4/2015 |

\* cited by examiner

METHOD, DEVICE AND SYSTEM FOR FITNESS TRACKING

CROSS-REFERENCE TO RELATED APPLICATIONS

This patent application claims the benefit of priority from U.S. Provisional Patent Application Ser. No. 62/152,889, filed on Apr. 26, 2015, entitled "Method, Device and System for Fitness Tracking," which is hereby incorporated by reference in its entirety.

FIELD OF THE INVENTION

The present invention is in the field of health and fitness. More specifically, the invention relates to an insole worn in a shoe for measuring the wearer's weight, steps taken, calories burned, distance traveled, speed and other parameters, which replaces the conventional scale and pedometer.

BACKGROUND OF THE INVENTION

The core features of weight measurement technology have changed very little over the centuries. A balance yields a weight measurement relative to another object, while a scale can provide a measurement based on the deformation of a strain gauge load cell. Measurement accuracy has increased greatly with the advent of digital technology, but the underlying mechanisms are the same. For an individual to weigh an object or oneself, the individual must place the object or herself directly onto a scale to yield a measurement. The scale is always an external or third-party object relative to the individual seeking a weight measurement.

Contemporary weight measurement is based on the same technologies used thousands of years ago: a scale or a balance. The bathroom, kitchen, mailroom, and laboratory scales people are typically familiar with use some form of a strain gauge. A strain gauge operates as follows: 1) an object is placed on the scale; 2) a rod inside the scale deforms proportionally to the amount of force applied by the object; and 3) a mechanical or digital weight reading is displayed, notifying the user how much the object weighs. The primary advances in this technology over the past few hundred years have been in how accurately the scale can report the weight of the object.

While strain gauge-based scales may be adequate for many time-insensitive and traditional applications, they lack the ability to give the user measurements in a dynamic environment. The scale is a stationary instrument and compels the user to bring the object to be weighed to the instrument. Luggage scales are more mobile than other scales but lack precision and are awkward to use (for weighing luggage or any other object). Attempting a measurement of one or more objects (or persons) over a short period of time requires special and expensive infrastructure to be constructed around the scale, similar to the scales built around conveyor belts used by UPS®, FedEx®, and USPS®. In short, the scale is a third-party instrument relative to the user and the object to be weighed, and requires effort and special circumstances for its use.

Although there are other "smartshoes" on the market, these products have many of the same limitations as conventional weight measurement systems, e.g., traditional strain gauge scales. For example, prior art inventions at best can measure a qualitative change in pressure, not a quantitative, accurate, and precise measurement of weight and force.

SUMMARY OF EMBODIMENTS OF THE INVENTION

An embodiment of the invention includes a method of fitness tracking. The method may be performed on a computer having a processor, a memory, and one or more code sets stored in the memory and executing by the processor. The method may include receiving, as inputs, data collected from a plurality of sensors embedded in one or more insoles; filtering the data; executing an evolutionary algorithm on the data, in which the evolutionary algorithm converges the data from the plurality of sensors; and determining, based on the converged data, a total weight applied to the one or more insoles. In some embodiments, the method may further include generating a test data set based on one or more samples of the data from a first set of the plurality of sensors, in which the first set of the plurality of sensors are embedded in a first insole of the one or more insoles; associating a known weight quantity with a second set of the plurality of sensors; in which the second set of the plurality of sensors are embedded in a second insole of the one or more insoles; applying a fitness function to the test data and the known weight quantity; and determining, based on the fitness function, whether or not the genetic algorithm has optimally converged, such that a predicted weight can be applied to a new data sample outside the test data set.

In some embodiments of the method, the first insole and the second insole constitute a pair of insoles adapted to be worn by a single user. In some embodiments, the filtering includes at least one of: low-pass filtering, Gaussian filtering, moving average filtering, smoothing, rejection of outlier data points, interpolation, frequency, domain transformation, and dimension reduction. In some embodiments, the evolutionary algorithm is one of: a genetic algorithm, a particle swarm optimization algorithm, and a differential evolution algorithm. In some embodiments, the plurality of sensors comprises at least one of force sensors and pressure sensors. In some embodiments, the plurality of sensors are embedded in one or more regions of the one or more insoles, and in which each region of the one or more insoles in adapted to contact a region of a foot of a user. In some embodiments, the data collected from the plurality of sensors embedded in the one or more insoles is transmitted wirelessly to the processor.

Embodiments of the invention may further include a system for fitness tracking, which may include: one or more insoles, the one or more insoles having embedded therein a plurality of sensors; a computer having a processor and memory; and one or more code sets stored in the memory and executing by the processor, which, when executed, configure the processor to: receive, as inputs, data collected from the plurality of sensors embedded in the one or more insoles; filter the data; execute an evolutionary algorithm on the data, in which the evolutionary algorithm converges the data from the plurality of sensors; and determine, based on the converged data, a total weight applied to the one or more insoles.

In some embodiments of the system, the processor may generate a test data set based on one or more samples of the data from a first set of the plurality of sensors, in which the first set of the plurality of sensors are embedded in a first insole of the one or more insoles; associate a known weight quantity to a second set of the plurality of sensors; in which the second set of the plurality of sensors are embedded in a second insole of the one or more insoles; apply a fitness function to the test data and the known weight quantity; and determine, based on the fitness function, whether or not the genetic algorithm has optimally converged, such that a predicted weight can be applied to a new data sample outside the test data set.

In some embodiments, the first insole and the second insole constitute a pair of insoles adapted to be worn by a single user. In some embodiments, the filtering comprises at least one of: low-pass filtering, Gaussian filtering, moving average filtering, smoothing, rejection of outlier data points, interpolation, frequency, domain transformation, and dimension reduction. In some embodiments, the evolutionary algorithm is one of: a genetic algorithm, a particle swarm optimization algorithm, and a differential evolution algorithm. In some embodiments, the plurality of sensors includes at least one of force sensors and pressure sensors. In some embodiments, the plurality of sensors is embedded in one or more regions of the one or more insoles, and in which each region of the one or more insoles in adapted to contact a region of a foot of a user. In some embodiments, the data collected from the plurality of sensors embedded in the one or more insoles is transmitted wirelessly to the processor.

Further embodiments of the invention include a device for fitness tracking, including: one or more insoles, the one or more insoles having embedded therein a plurality of sensors and wireless data transmitter, the one or more insoles configured to collect data and wireless transmit the data to a computer having a processor, memory, and one or more code sets stored in the memory and executing by the processor, which, when executed, configure the processor to: receive, as inputs, the data collected from the plurality of sensors embedded in the one or more insoles; filter the data; execute an evolutionary algorithm on the data, in which the evolutionary algorithm converges the data from the plurality of sensors; and determine, based on the converged data, a total weight applied to the one or more insoles.

In some embodiments, the one or more code sets further configure the processor to: generate a test data set based on one or more samples of the data from a first set of the plurality of sensors, in which the first set of the plurality of sensors are embedded in a first insole of the one or more insoles; associate a known weight quantity to a second set of the plurality of sensors; in which the second set of the plurality of sensors are embedded in a second insole of the one or more insoles; apply a fitness function to the test data and the known weight quantity; and determine, based on the fitness function, whether or not the genetic algorithm has optimally converged, such that a predicted weight can be applied to a new data sample outside the test data set.

In some embodiments of the device, the first insole and the second insole constitute a pair of insoles adapted to be worn by a single user. In some embodiments, the evolutionary algorithm is one of: a genetic algorithm, a particle swarm optimization algorithm, and a differential evolution algorithm.

These and other aspects, features and advantages will be understood with reference to the following description of certain embodiments of the invention.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings. Embodiments of the invention are illustrated by way of example and not limitation in the figures of the accompanying drawings, in which like reference numerals indicate corresponding, analogous or similar elements, and in which:

Figure 1:
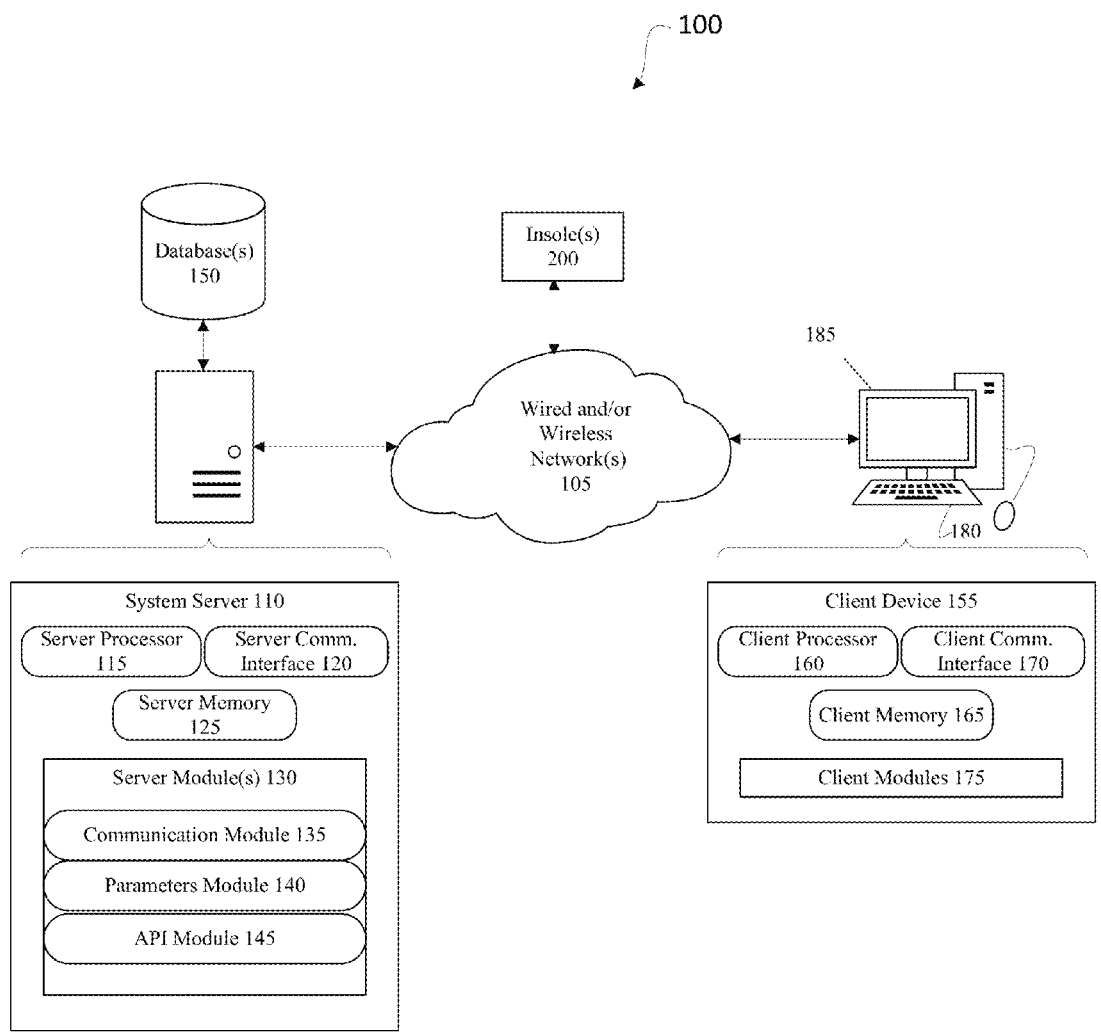
FIG. 1 is a high level diagram illustrating an example configuration of a system for fitness tracking according to at least one embodiment of the invention.

It will be appreciated that for simplicity and clarity of illustration, elements shown in the figures have not necessarily been drawn accurately or to scale. For example, the dimensions of some of the elements may be exaggerated relative to other elements for clarity, or several physical components may be included in one functional block or element. Further, where considered appropriate, reference numerals may be repeated among the figures to indicate corresponding or analogous elements.

DETAILED DESCRIPTION OF EMBODIMENTS OF THE INVENTION

In the following description, various aspects of the present invention will be described. For purposes of explanation, specific configurations and details are set forth in order to provide a thorough understanding of the present invention. However, it will also be apparent to one skilled in the art that the present invention may be practiced without the specific details presented herein. Furthermore, well known features may be omitted or simplified in order not to obscure the present invention.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory processor-readable storage medium that may store instructions, which when executed by the processor, cause the processor to perform operations and/or processes. Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. The term set when used herein may include one or more items. Unless explicitly stated, the method embodiments described herein are not constrained to a particular order or sequence. Additionally, some of the described method embodiments or elements thereof may occur or be performed simultaneously, at the same point in time, or concurrently.

Embodiments of the invention therefore provide a shoe-based weight detection system. The system may consist of four main components: (1) an insole (or pair of insoles) insertable into and worn in a shoe or sneaker for measuring, a wearer's weight, instantaneous change in weight, calories burned, distance traveled, speed, cadence and/or other parameters relating to health, industrial safety, fitness, and activity tracking; (2) a web-based, mobile-based (e.g., Android® or iOS®), or desktop-based application; (3) a front-end interface for users; and (4) a backend system for data storage, web serving etc., as described in detail below. These and other features of embodiments of the invention will be further understood with reference to the figures as described herein.

FIG. 1 shows a high level diagram illustrating an example configuration of a system 100 for fitness tracking, according to at least one embodiment of the invention. System 100 includes network 105, which may include the Internet, one or more telephony networks, one or more network segments including local area networks (LAN) and wide area networks (WAN), one or more wireless networks, or a combination thereof. System 100 also includes a system server 110 constructed in accordance with one or more embodiments of the invention. In some embodiments, system server 110 may be a stand-alone computer system. In other embodiments, system server 110 may include a network of operatively connected computing devices, which communicate over network 105. Therefore, system server 110 may include multiple other processing machines such as computers, and more specifically, stationary devices, mobile devices, terminals, and/or computer servers (collectively, "computing devices"). Communication with these computing devices may be, for example, direct or indirect through further machines that are accessible to the network 105.

System server 110 may be any suitable computing device and/or data processing apparatus capable of communicating with computing devices, other remote devices or computing networks, receiving, transmitting and storing electronic information and processing requests as further described herein. System server 110 is therefore intended to represent various forms of digital computers, such as laptops, desktops, workstations, personal digital assistants, servers, blade servers, mainframes, and other appropriate computers and/or networked or cloud based computing systems capable of employing the systems and methods described herein.

System server 110 may include a server processor 115 which is operatively connected to various hardware and software components that serve to enable operation of the system 100. Server processor 115 serves to execute instructions to perform various operations relating to fitness tracking, health-related parameter calculation, and other functions of embodiments of the invention as will be described in greater detail below. Server processor 115 may be one or a number of processors, a central processing unit (CPU), a graphics processing unit (GPU), a multi-processor core, or any other type of processor, depending on the particular implementation. System server 110 may be configured to communicate via communication interface 120 with various other devices connected to network 105, including, for example, server database 150, client device 155, and/or insoles 200, as described herein. For example, communication interface 120 may include but is not limited to, a modem, a Network Interface Card (NIC), an integrated network interface, a radio frequency transmitter/receiver (e.g., Bluetooth wireless connection, cellular, Near-Field Communication (NFC) protocol, a satellite communication transmitter/receiver, an infrared port, a USB connection, and/or any other such interfaces for connecting the system server 110 to other computing devices and/or communication networks such as private networks and the Internet.

In certain implementations, a server memory 125 is accessible by server processor 115, thereby enabling server processor 115 to receive and execute instructions such a code, stored in the memory and/or storage in the form of one or more software modules 130, each module representing one or more code sets. The software modules 130 may include one or more software programs or applications (collectively referred to as the "server application") having computer program code or a set of instructions executed partially or entirely in server processor 115 for carrying out operations for aspects of the systems and methods disclosed herein, and may be written in any combination of one or more programming languages. Server processor 115 may be configured to carry out embodiments of the present invention by for example executing code or software, and may be or may execute the functionality of the modules as described herein.

As shown in FIG. 1, the exemplary software modules may include a communication module 135, a parameters module 140, and an API module 145. Communication module 135 may be executed by server processor 115 to facilitate communication between system server 110 and the various software and hardware components of system 100, such as, for example, server database 150, client device 155, and/or insoles 200, as described herein. Parameters module 140 may be executed by server processor 115 to receive or collect data from server database 150, client device 155, and/or insoles 200, and calculate/determine various parameters related to fitness and health, as described herein. API module 145, as described in detail herein, may be executed by server processor 115 to implement an Application Programming Interface (API) with which third-party systems can communicate, as described herein.

It should be noted that in accordance with various embodiments of the invention, server modules 130 may be executed entirely on system server 110 as a stand-alone software package, partly on system server 110 and partly on client device 155, or entirely on client device 155.

Server memory 125 may be, for example, a random access memory (RAM) or any other suitable volatile or non-volatile computer readable storage medium. Server memory 125 may also include storage which may take various forms, depending on the particular implementation. For example, the storage may contain one or more components or devices such as a hard drive, a flash memory, a rewritable optical disk, a rewritable magnetic tape, or some combination of the above. In addition, the memory and/or storage may be fixed or removable. In addition, memory and/or storage may be local to the system server 110 or located remotely.

In accordance with further embodiments of the invention, system server 110 may be connected to one or more database(s) 150, for example, directly or remotely via network 105. Database 150 may include any of the memory configurations as described above, and may be in direct or indirect communication with system server 110. In some embodiments, database 150 stores data collected from client device 155 and/or insoles 200. In some embodiments, database 150 may store information related to analysis of parameters (e.g., calculated by parameters module 140).

As described herein, among the computing devices on or connected to the network 105 may be one or more client devices 155. Client device 155 may be any standard computing device. As understood herein, in accordance with one or more embodiments, a computing device may be a stationary computing device, such as a desktop computer, kiosk and/or other machine, each of which generally has one or more processors, such as client processor 160, configured to execute code to implement a variety of functions, a computer-readable memory, such as client memory 165, a client communication interface 170, for connecting to the network 105, one or more client modules, such as client module 175, one or more input devices, such as input devices 180, one or more output devices, such as output devices 185, and/or insole(s) 200. Typical input devices, such as, for example, input devices 185, may include a keyboard, pointing device (e.g., mouse or digitized stylus), a web-camera, and/or a touch-sensitive display, etc. Typical output devices, such as, for example output device 185 may include one or more of a monitor, display, speaker, printer, etc.

In some embodiments, client module 175 may be executed by client processor 160 to provide the various functionalities of client device 155. In particular, in some embodiments, integration client module 175 may provide a client-side interface with which a user of client device 155 can interact, to, among other things, provide and/or view health and fitness related information and data, receive, and analyze parameter results, etc.

Additionally or alternatively, a computing device may be a mobile electronic device ("MED"), which is generally understood in the art as having hardware components as in the stationary device described above, and being capable of embodying the systems and/or methods described herein, but which may further include componentry such as wireless communications circuitry, gyroscopes, inertia detection circuits, geolocation circuitry, touch sensitivity, among other sensors. Non-limiting examples of typical MEDs are smartphones, personal digital assistants, tablet computers, smartwatches, and the like, which may communicate over cellular and/or Wi-Fi networks or using a Bluetooth or other communication protocol. Typical input devices associated with conventional MEDs include, keyboards, microphones, accelerometers, touch screens, light meters, digital cameras, and the input jacks that enable attachment of further devices, etc.

In some embodiments, client device 155 may be a "dummy" terminal, by which processing and computing may be performed on system server 110, and information may then be provided to client device 155 via server communication interface 120 for display and/or basic data manipulation. In some embodiments, modules depicted as existing on and/or executing on one device may additionally or alternatively exist on and/or execute on another device. For example, in some embodiments, parameter module 140, which is depicted in FIG. 1 as existing and executing on system server 110, may additionally or alternatively exist and/or execute on client device 155. In some embodiments, the external computing device (e.g., client device 155) may include or otherwise be connected to an application programming interface (API), e.g., API module 145 of system server 110. In some embodiments, the API may allow third-party developers to access information from one or more insoles or pairs of insoles, as described herein. The data accessible from the API may be used by third-party developers to, e.g., design their own mobile, web, or internet of things (IoT) applications.

Figure 2A:
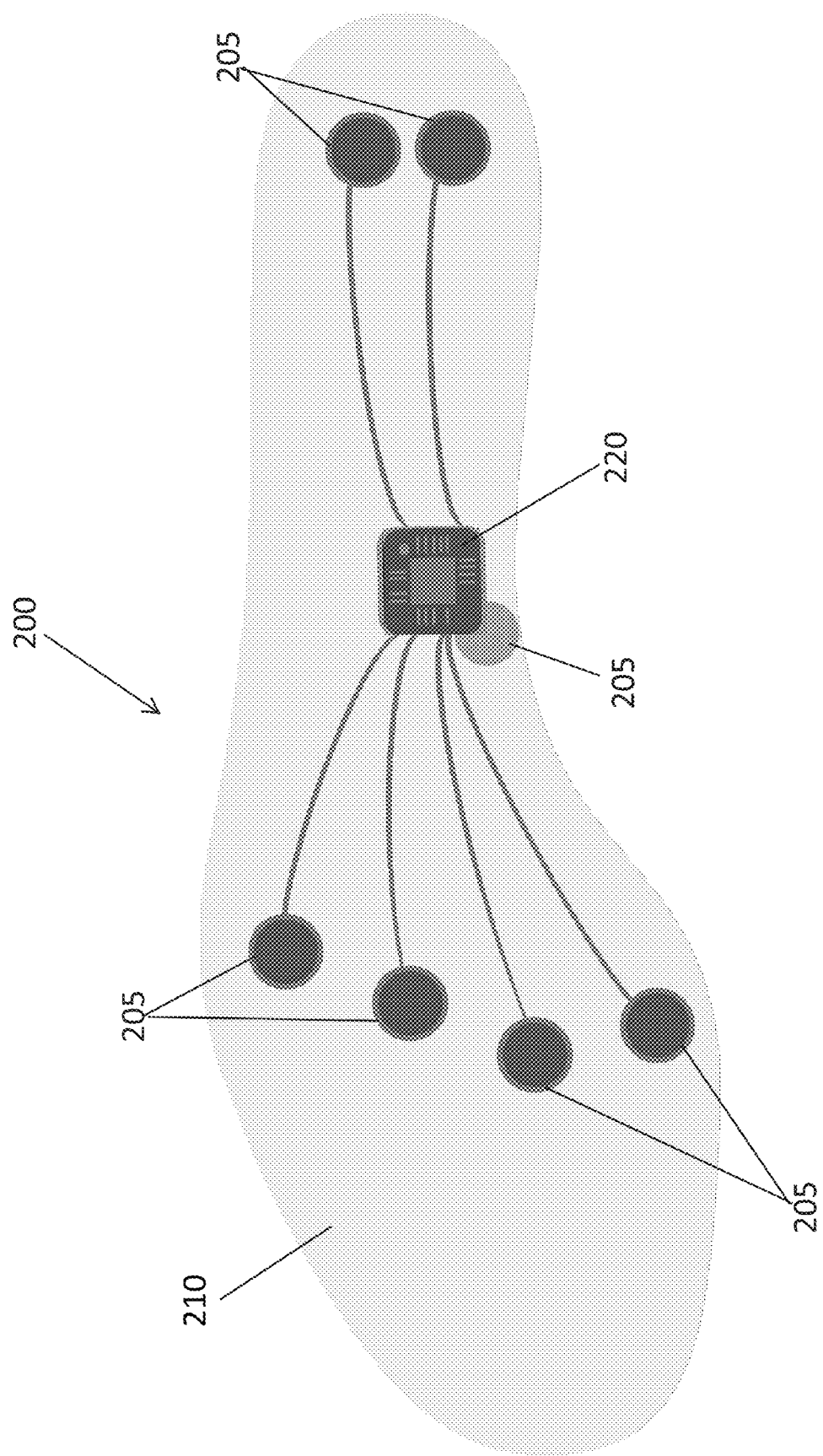
FIG. 2A shows an insole according to at least one embodiment of the invention.
Figure 2B:
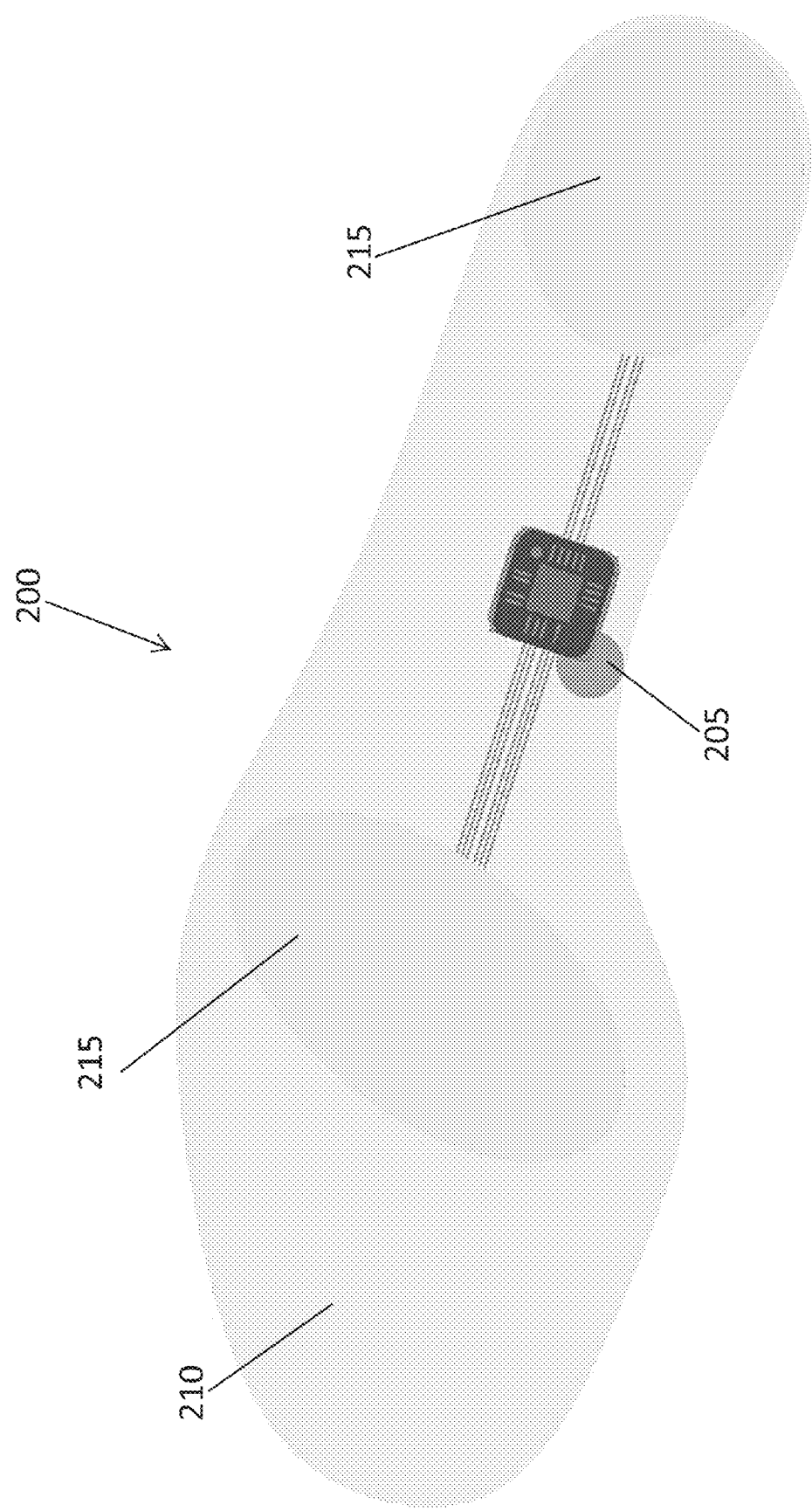
FIG. 2B shows an insole according to at least one embodiment of the invention.

System 100 may further include one or more insole(s) 200, which are described in detail with regard to FIGS. 2A-B, and which collect data related to fitness and health of a wearer of the insoles.

FIG. 2A shows an insole 200 (e.g., insole(s) 200 of FIG. 1) in accordance with some embodiments of the invention. Embodiments of the invention may include one or more sensors 205 embedded, affixed, or otherwise integrated with the insole 200, which may include one or more discrete layers. In some embodiments, the one or more discrete layers may be permanently combined into one insole, while in some embodiments the discrete layers may be detachably affixed to one another, e.g., via an adhesive, Velcro, or other fastening means.

The one or more sensors 205 may be configured to sense, detect, receive, collect, and/or measure various types of data for determining various parameters such as, for example, force (e.g., a FlexiForce A101 Sensor), pressure, location, linear acceleration, angular acceleration, angular velocity, magnetic fields, torque, temperature, altitude, time, light, humidity, etc. In some embodiments, one or more of the sensors 205, e.g., the acceleration, angular velocity, and/or magnetic field sensor, may be fused into a single discrete inertial measurement unit. In some embodiments, the force and/or pressure sensors may be housed in a unique sensing layer 210 within the insole. In various embodiments, this "sensing layer" 210 may take one of a plurality of forms.

In a first form, a plurality of discrete force and/or pressure sensors 205 (e.g., seven sensors) may be placed in various locations within the insole 200 in such a configuration so as to obtain a maximum force and/or pressure response from the wearer's foot. In some embodiments, the distribution, configuration, and/or number of sensors in the sensing layer 210 may be unique to the shape of an individual wearer's foot, while in other embodiments, the distribution, configuration, and/or number of sensors 205 may be identical for a plurality of wearers, e.g., all wearers, or all wearers in a particular category or categories (e.g., based on age, gender, weight, height, profession, and/or use, etc.). In some embodiments, the distribution, configuration, and/or number of sensors in a pair of insoles 200 (e.g., a left foot insole and a right foot insole of one wearer) may be the same for both insoles, while in other embodiments each insole in the pair may have a different distribution, configuration, and/or number of sensors.

Turning briefly to FIG. 2B, in a second form, the sensing layer 210 may include a matrix of smaller, pixelated force and/or pressure sensors 215 throughout, e.g., an entire area of the sensing layer 210, or throughout one or more discrete coverage areas, e.g., in a heal area, an arch area, an instep area, a ball area, a sole area, and/or a toe area, etc.

In a third form (shown in FIG. 2B), the sensing layer 210 may include a combination of both a single sensor 205 capable of detecting the force and/or pressure applied across the entire area of the insole 200 as well as other overlapping matrix sensors 215 that detect the force and/or pressure applied to a particular region of the insole.

In some embodiments, the coverage area(s) in the sensing layer 210 may be unique to the shape of an individual wearer's foot, while in other embodiments, the coverage area(s) may be identical for a plurality of wearers, e.g., all wearers, or all wearers in a particular category or categories (e.g., based on age, gender, weight, height, profession, and/or use, etc.). In some embodiments, the coverage area(s) of sensors 215 in a pair of insoles (e.g., a left foot insole and a right foot insole of one wearer) may be the same for both insoles, while in other embodiments each insole in the pair may have different coverage area(s) of sensors.

Turning back to FIG. 2A, in some embodiments, one or more additional sensing components may be integrated into the insole(s) 200, including, for example, an accelerometer for measuring acceleration in one, two, and/or three dimensions; a gyroscope for measuring angular velocity in one, two, and/or three dimensions; a magnetometer for measuring magnetic fields in one, two, and/or three dimensions; a thermometer for measuring temperature; and/or a barometer for measuring pressure, etc.

In some embodiments, a composite sensing device may be integrated into the insole(s), such as, for example, a 9-axis combination accelerometer/gyroscope/magnetometer unit, e.g. the InvenSense MPU-925x series sensing device. In some embodiments, a composite sensing device may be integrated into the insole(s) 200, such as, for example, an 11-axis combination accelerometer/gyroscope/magnetometer/thermometer/barometer (e.g., GY-80—Multi Sensor Board). In some embodiments, a tilt sensor (e.g., a MMA7455 Digital Tilt Angle Sensor) for measuring inclination or tilt angle may be integrated into the insole(s) 200.

In some embodiments, power may be provided to the insole 200, e.g., by a battery housed inside or otherwise affixed and/or connected to the insole 200, and/or other powering means. In some embodiments, a battery may be permanently integrated in the insole 200, while in some embodiments, a battery may be removably integrated in the insole 200. In some embodiments, the battery may be charged, e.g., by a standard power or data transmission cable and/or by wireless charging methods (e.g., via a wireless charging transmitter and a receiver integrated into the insole). In some embodiments, insole 200 may include an adapter such that a power cable may be used to recharge the battery. In some embodiments, the battery may be charged via a kinetic movement charging mechanism. In some embodiments, the battery may be a lithium ion battery or other comparable battery. In some embodiments, the battery may be a flexible battery, e.g., capable of being integrated into a flex circuit or flex PCB. In some embodiments, the battery may be housed or otherwise mounted outside of the insole 200, e.g., in the shoe of the wearer.

In some embodiments, one or more processing units 220 (e.g., microprocessors) may be housed inside the insole 200 to control data received from the one or more sensors 205 (and/or 210) within the insole 200 and to communicate with an application hosted, e.g., on a smartphone, tablet, computer, cloud server, or other external computing device 155. In some embodiments, the processing unit may be, for example, a Cortex-M, Cortex-A, or Cortex-R ARM processor, etc.

In some embodiments, the insole 200 may include a communication module for enabling communication between the processing unit and external hardware, such as a mobile application, a computer (e.g., system server 110 or client device 155), a WiFi access point, a satellite-based internet network, such as 3G and 4G, a cloud service system, other wearable devices, etc. In some embodiments, the communication device may include one or more of Bluetooth Classic, Bluetooth Low Energy, Ant+, RFID, GPS, or other radio frequency communication module in order to communicate with external communication devices wirelessly, e.g., in real time, at prescribed times, when activated manually, etc. In some embodiments, a port for wired data transmission may also or alternatively be included. In some embodiments, each insole of a pair of insoles 200 may include a communication module to communicate directly with the computing device (e.g., system server 110 or client device 155). In some embodiments, one insole of a pair of insoles 200 may communicate directly with a second insole of the pair of insoles 200, and the second insole may be configured to communicate information from both insoles to the computing device (e.g., system server 110 or client device 155).

A benefit of the invention is that it effectively brings the scale to the user's shoes, essentially eliminating the concept of the scale as a third-party or external instrument. With the click of his or her mobile phone, a user can weigh his or herself as well as any object he or she is capable of lifting, instantaneously and/or over time. Embodiments of the invention may be used in a variety of different real-life scenarios: measuring how much olive oil to pour out without a measuring cup; a pediatrician weighing a newborn without a scale; a weight lifter who keeps track of her repetitions through her phone rather than via a personal trainer; a warehouse worker with a back problem that receives a warning signal when he lifts more weight than safety regulations require; a 21'st century postal service in which packages no longer have to be brought to a central depot to be weighed, labeled, and redirected, etc. Embodiments of the invention provide real-time measurement over days, weeks, and/or months, e.g., for people with health problems that require them to monitor their weight.

Figure 3A:
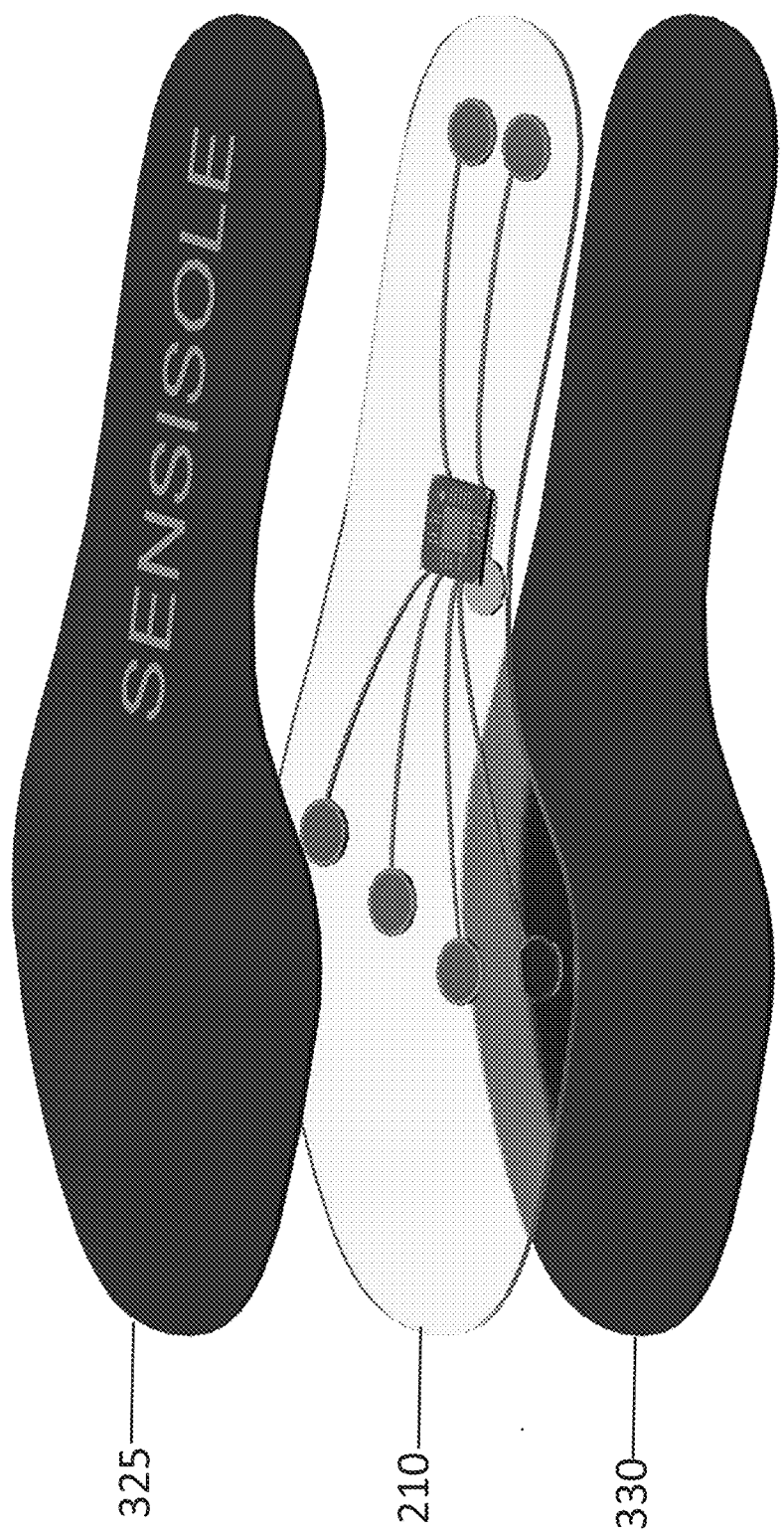
FIG. 3A shows an insole according to at least one embodiment of the invention.
Figure 3B:
FIG. 3B shows an insole according to at least one embodiment of the invention.

Turning briefly to FIGS. 3A and 3B, embodiments of the invention may further include an upper layer 325, e.g., made of silicon, rubber, foam, or other flexible, supporting, and/or cushioning material. The upper layer 325 may be configured to provide traction, support, and/or comfort to the foot of the wearer of the insole 200. In some embodiments, the insole 200 may include a bottom layer 330, e.g., made of a rigid, semi-rigid, flexible, or semi-flexible material (e.g., plastic, rubber, fiberglass, carbon, etc.), and may further include an adhesive or other texture to provide a bond or traction against the inside of a shoe of the wearer. In some embodiments, the sensing layer 210 may be sandwiched or otherwise positioned between the upper layer 325 and the lower layer 330.

Figure 4:
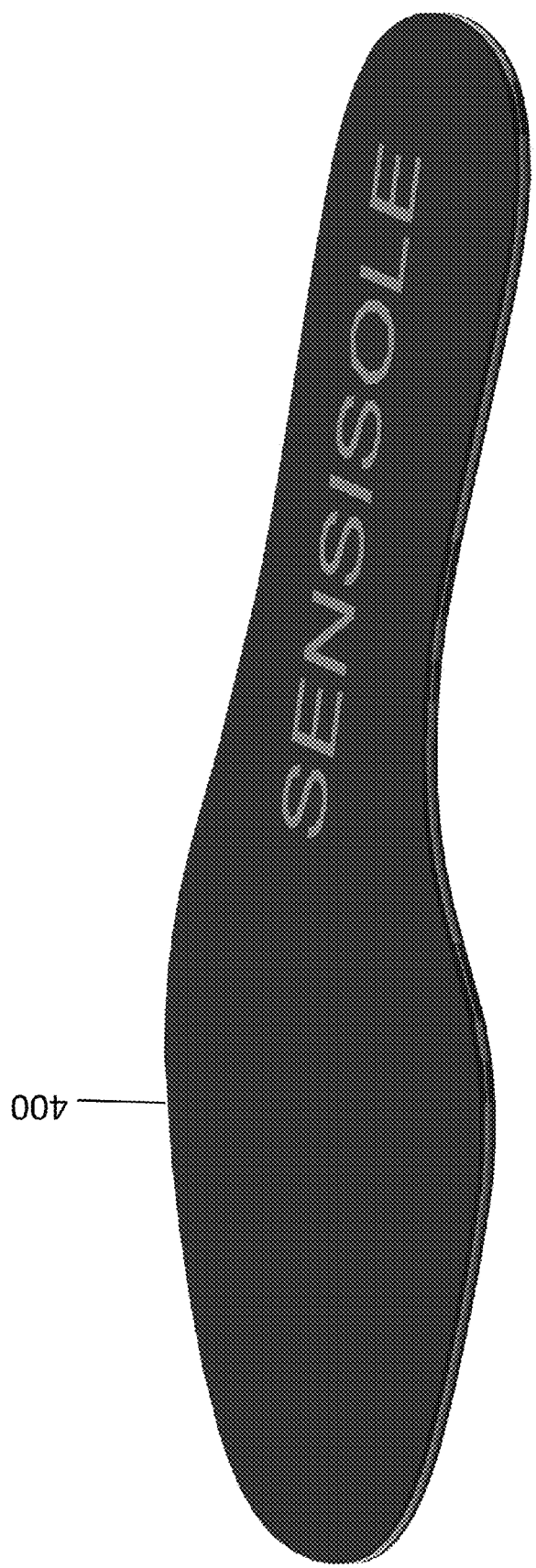
FIG. 4 shows an insole according to at least one embodiment of the invention.

Turning briefly to FIG. 4, in some embodiments, two or more layers may be combined into one contiguous unit 400, e.g., to provide a convenient form factor for inserting the insole 200 into a shoe. In some embodiments, the insole(s) may be "bundled" into an insole-shoe package. In some embodiments, the insole of the bundle may be removable, whereas in other embodiments the shoe may be constructed in such a way that the insole is integrated directly into the shoe and/or is otherwise not removable. In some embodiments, the various components of insole 200 may be integrated into a sock or other sleeve, which in various embodiments may be worn with or without a shoe.

In some embodiments, the insole 200 may include a removable storage card such as a microSD card, to transfer data to and/or from the insole 200 to an external device. In some embodiments, insole 200 may have permanently integrated memory for storing collected data locally on the insole 200. In some embodiments, some or all of the computing/sensing components may be T mounted on a traditional printed circuit board, and/or incorporated into a more novel circuit board, such as a Flex Circuit/Flex PCB.

Figure 5:
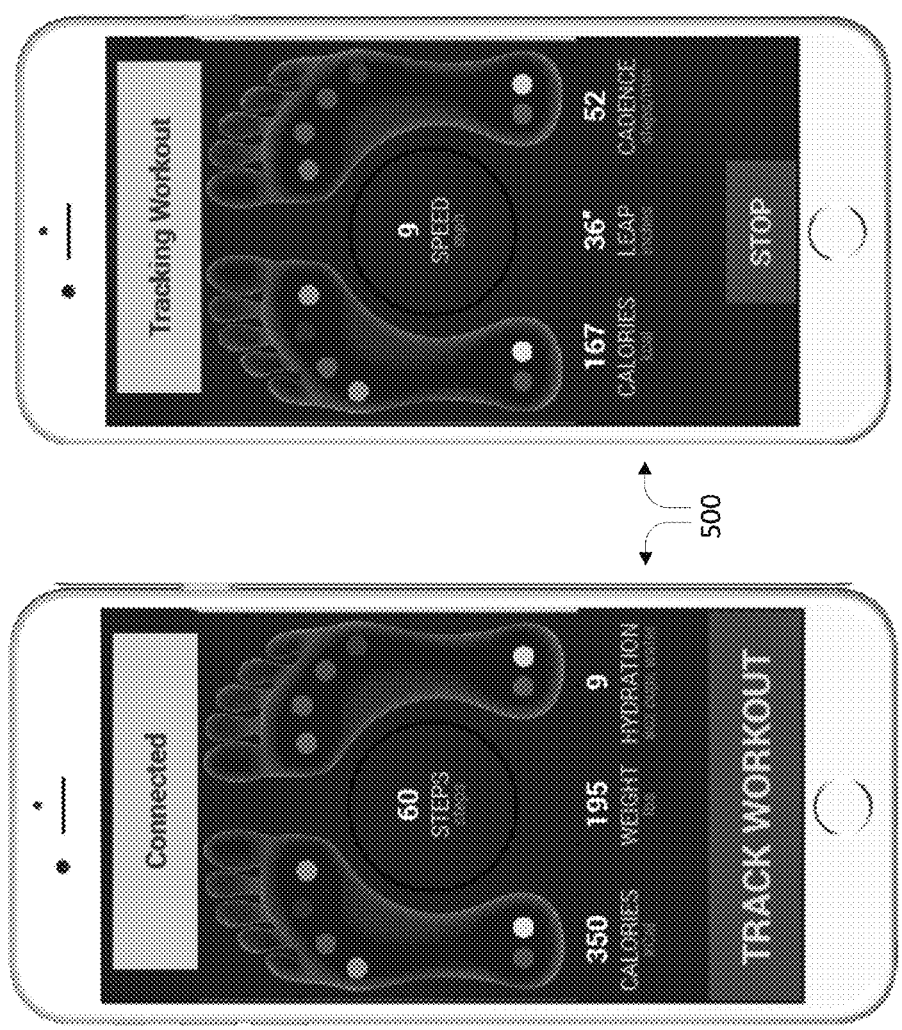
FIGS. 5A-5B show two Graphical User Interfaces (GUIs) of a mobile application of system for fitness tracking according to embodiments of the invention.

Turning now to FIGS. 5A-5B, Graphical User Interfaces (GUIs) of a mobile application of system 100 are shown according to embodiments of the invention. System 100 may include one or more software programs to transmit, process, and report data collected from insole(s) 200. Additionally, the user may control the behavior of the insole 200 and data reporting through various software packages. In some embodiments, a user may interact with and control the insole 200 through a mobile application, such as, for example, mobile application 500 (e.g., on an Android, iOS, or some other operating system), or a purely web-based mobile interface. In various embodiments, multiple applications in different mobile operating systems or formats may be provided to ensure that as many people as possible can use the application 500 on their mobile device. The mobile application 500 may consist of one or more of the following user interface components:

A registration section, in which the user may create a personal "user profile". The user may be required to choose a username and password, and to provide additional identifying information such as an e-mail address, home address, city, state, country, occupation, date of birth, and personal interests.

An authentication section, in which the user may be required to input a username or e-mail address and password in order to verify the user's identity. The authentication system may use state-of-the-art authentication algorithms such as OAUTH, or some other verification scheme as generally understood in the art.

A payment section, in which the user may input credit card or other banking information. This information may be used to pay for related products, subscriptions, or services, and may be verified using state-of-the-art security algorithms and services.

A "home page", with links to various sections of the application 500 that the user may tap on to access, and/or use built-in or custom-designed voice recognition software so as to navigate the application with voice commands.

A "control" section. The control section may be the section of the application 500 in which the user may directly control the behavior of the insole 200 through tapping or voice commands. Some of the control features may include: a display for the sum total weight applied to the insoles, ostensibly the weight of the user; a button to "zero" the sum total weight, akin to the zeroing feature on a conventional kitchen or laboratory scale; a series of buttons to modify the frequency at which the insole collects weight, pressure, or other measurements collected by the insole. The buttons may include, for example, the following:

"off", e.g., that no measurements should be taken
"Continuous", e.g., that measurements should be taken several times a second
a user-defined input, e.g., the user can manually enter 30 seconds, two minutes, one hour, etc., so that measurements will be taken during that time span A series of buttons to control whether or not to record measurements, or to merely display them on the screen, such as, for example, the following:

Display only, e.g., only display the measurements in the display
Store "in-shoe", e.g., store the measurements in the memory storage component of the insole
Store "in-phone", e.g., store the measurements in the memory storage component of the user's phone
Store "in-cloud", e.g., wirelessly transmit the measurements to a remote cloud service or server a "reports" section. The reports section of the application 500 may feature graphs, charts, and other graphic items that reflect the previous measurements and data calculated and/or recorded by the insole, such as, for example, the following:
Total weight applied to the SSI over some time period
"zeroed" weight applied to the SSI over some time period
Periods of greater change in weight, which may be modified by some user-selected threshold A "social media" section. The social media section of the application 500 may integrate features of, e.g., Google®, Twitter®, Facebook®, Instagram®, and/or other social media. The user may have the option of sending a tweet, Instagram photo, or Facebook update that contains information about recorded weight measurements.

A "sync" section. In the sync, or synchronization section of the application 500, the user has the ability to establish a wireless connection between her mobile phone and her insoles 200, pair the devices, and allow for the exchange of data between them.

In some embodiments, the mobile application 500 may also contain software to redirect or process data received from a user's insoles 200, thus making it ready for storage or for display to the user. In some embodiments, data processing may occur in the processing unit 220 of the insoles 200, in a processing unit of the user's mobile phone (e.g., client device 155), on a remote server (e.g., system server 110), or some combination of the previously mentioned options. In some embodiments, communication between the mobile application 500 and a remote server (e.g., system server 110) may take place over WiFi or some other internet connection. In some embodiments, additional or other software programs may be stored in the processing unit 220 of the insole 200. This software may facilitate communication between the sensing, wireless communication, and processing components of the insole 200, as well as communication between the insole 200 and a mobile or desktop application, or the insole and a remote server.

In some embodiments, a desktop version of mobile application 500 may also or alternatively be provide, replicating some or all of the components and systems of mobile application 500. In some embodiments, additional features not included in the mobile application may be included in the desktop application.

In some embodiments, e.g., where insoles 200 provide all-day or near all-day use, each user may generate a significant amount of data when the system 100 is receiving or recording measurements from insoles 200. For this reason, in some embodiments, a remote server system (such as system server 110 and database(s) 150 may be necessary for both storing and processing data. The remote server or servers 110 may be further connected to other third-party cloud storage service, such as, for example, Amazon EC2. A relational or non-relation database system may be used to store and organize user data. In some embodiments, system 100 may use an aggregate, anonymized version of personal user data to analyze user behavior, patterns, and trends that may be present. This data may or may not be available users or to third-party customers.

In some embodiments, raw or partially processed data transmitted to the mobile application 500 or a remote server (e.g., system server 110) may not be useful to users due to noise from the sensors and hardware components, or the limitations of the hardware components. For this reason, in some embodiments, additional processing may be performed to approximate results of the data to a very high level of accuracy. Processing techniques may include classical or artificial intelligence algorithms for processing such parameters as acceleration, rotation, temperature, pressure, magnetic field strength, etc. Measurements from additional sensors may be incorporated into processing in order to generate a more accurate force measurement.

In some embodiments, data collected from the plurality of insole-embedded sensors described herein may be used as inputs for an artificial intelligence (AI) program to ultimately determine the weight applied to the insoles 200. In some embodiments, this data may be filtered or transformed prior to being applied to the AI algorithm to generate better results. Preprocessing steps may include, but are not limited to, low-pass, Gaussian, moving average, and/or other smoothing filters, the rejection of "outlier" data points which may be classified as erroneous based on some pre-determined threshold, interpolation, frequency or other domain transformation, and dimension reduction.

In some embodiments, after appropriate preprocessing, data may be input into an artificial intelligence software module. The artificial intelligence module may be designed to "learn" what weight is applied to an insole(s) 200 based on a plurality of data points taken at a single time point. In some embodiments, this module may run on either the processing unit 220 embedded in the insoles 200, on the processor of the user's mobile phone (e.g., as client modules 175 on client processor 160 of client device 155), or on a processor of a remote server (e.g., as parameters module 140 on server processor 115 of system server 110). In some embodiments, the artificial intelligence module may take the form of an evolutionary algorithm such as, for example, a genetic algorithm, a particle swarm optimization algorithm, and/or a differential evolution algorithm.

A genetic algorithm, for example, converges to the solution of a problem by mimicking the replication, mating, and mutation of chromosomes within DNA. Roughly, the algorithm 1) randomly generates many potential solutions within a search space; 2) evaluates the fitness of each solution; 3) produces a new generation of solutions through "survival of the fittest"-type selection, mating, and mutation of the previous generation; 4) repeats steps 2) and 3) for a set number of generations, a set duration of time, and/or until a set error minimization threshold has been reached.

The solution that the genetic algorithm outlined above converges to is a series of coefficients, e.g., floating point numbers. The number of coefficients may be the same as the number of inputs to the genetic algorithm (ostensibly the total number of sensors 205 and/or 210 in one or both insoles 200). Each data point that is collected from a sensor may be multiplied by a corresponding coefficient. These coefficients may be collectively called the impact or solution matrix. If the genetic algorithm has converged, the sum of these products is equivalent to the total weight applied to the insole(s) 200. In some embodiments, once the genetic algorithm has been trained with a sufficient amount of data, it may not be necessary to perform steps 1) through 4) outlined above, and the sensor data applied to the program only needs to be multiplied by the solution matrix to calculate the weight applied to one or both insoles 200. In some embodiments, the genetic algorithm steps 1) through 4) may be repeated over time to improve results. In some embodiments, the inputs to the algorithm may be the samples from the sensors 205 and 210 in both insoles together, or the inputs may be the sensor samples from each insole individually and then combined in some way (e.g., direct summation, or summation after applying some multiplier to each predicted value, etc.).

In some embodiments, a test data set may be generated to train the genetic algorithm initially. The data set may consist of sensor data samples on the left hand side (e.g., inputs), and known weight quantities applied to the insole(s) on the right hand side. The data collected from an individual sensor at a given time may be referred to as a data point, whereas the data collected from all of the sensors 205 and/or 210 at a given time may be referred to as a sample. In some embodiments, a possible fitness function for step 2) of the genetic algorithm may be the mean squared error between the "predicted" weight values of a candidate solution (e.g., the sum of products of each solution coefficient times the corresponding data point in the sample) and the "actual" weight values applied to the insole(s) 200, for all samples. In some embodiments, if the candidate solution achieves a mean squared error of zero, then the genetic algorithm has optimally converged and the solution coefficients may be used to predict the weight of other samples not included in the test data set.

In some embodiments, when a user begins using a new set of insoles, a brief training period may be required to calibrate the insoles with the shape and features of the customer's feet. During this training period, in some embodiments, the customer may be required to input his or her actual weight into the mobile or desktop application 500. This target weight value may then be used as a right-hand side value to perform further iterations of the genetic algorithm, thus producing an updated solution matrix and more accurate weight measurement results.

In some embodiments, using the same sensor sample data but different right-hand side "actual" data, the genetic algorithm or other evolutionary algorithm may be used for other predictive purposes, such as measuring gait stage, vertical leap, and calorie consumption, for instance. In some embodiments, these predictions may or may not be included as inputs (in addition to the data points originating from sensors) to enhance weight measurement prediction data set.

Figure 6:
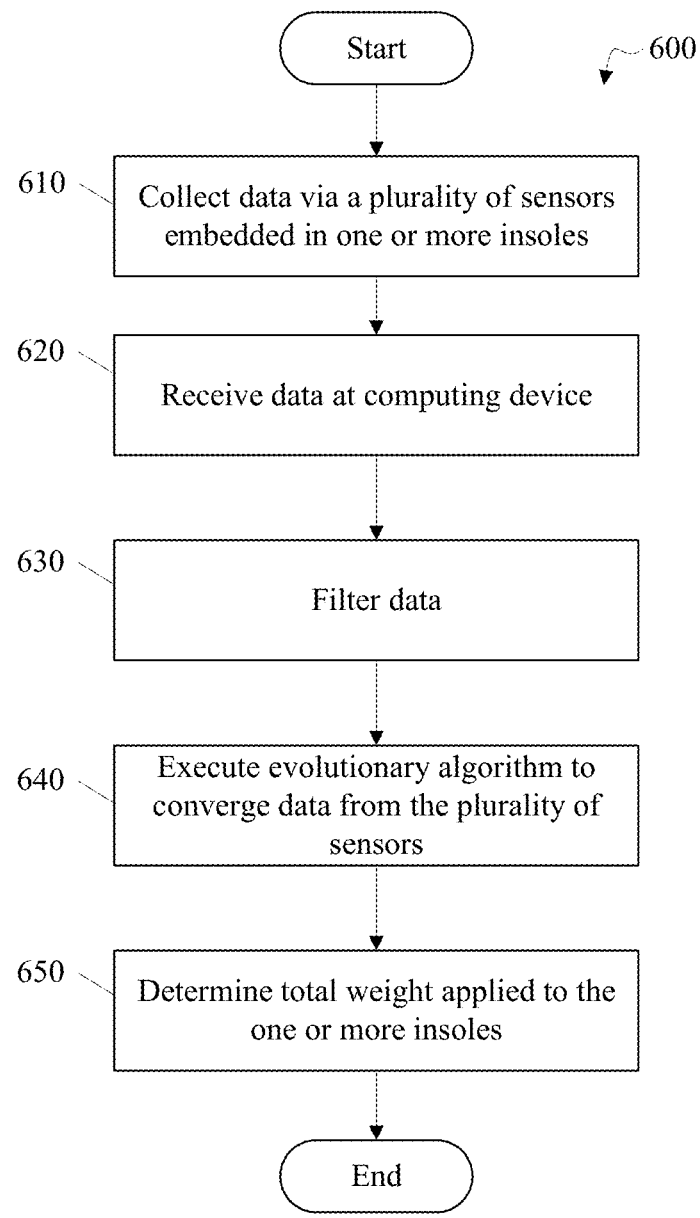
FIG. 6 is flow diagram of a method of fitness tracking according to at least one embodiment of the invention.

FIG. 6 shows a flow diagram of an example method 600 of fitness tracking according to at least one embodiment of the invention. Method 600 starts at step 610 data is collected by a plurality of sensors (e.g., 205 or 210) embedded in one or more insoles (e.g., insole(s) 200). At step 610, the data is transmitted to a computing device, such as, e.g., system server 110 and/or client device 155, where the data is received. At step 630, the received data is filtered, as described herein. Next, at step 640, a processor of the computing device may execute an evolutionary algorithm to converge data from the plurality of sensors, and at step 650, the processor may determine a total weight applied to the one or more insoles, and the method ends.

Unless explicitly stated, the method embodiments described herein are not constrained to a particular order or sequence. Furthermore, all formulas described herein are intended as examples only and other or different formulas may be used. Additionally, some of the described method embodiments or elements thereof may occur or be performed at the same point in time.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

Various embodiments have been presented. Each of these embodiments may of course include features from other embodiments presented, and embodiments not specifically described may include various features described herein.

What is claimed is:

1. A method of fitness tracking, performed on a computer having a processor, a memory, and one or more code sets stored in the memory and executing by the processor, the method comprising:
    receiving, as inputs, data collected from a plurality of sensors embedded in one or more insoles;
    filtering the data;

executing an evolutionary algorithm on the data, wherein the evolutionary algorithm converges the data from the plurality of sensors;
determining, based on the converged data, a total weight applied to the one or more insoles;
generating a test data set based on one or more samples of the data from a first set of the plurality of sensors, wherein the first set of the plurality of sensors are embedded in a first insole of the one or more insoles;
associating a known weight quantity with a second set of the plurality of sensors; wherein the second set of the plurality of sensors are embedded in a second insole of the one or more insoles;
applying a fitness function to the test data and the known weight quantity; and
determining, based on the fitness function, whether or not the evolutionary algorithm has optimally converged, such that a predicted weight can be applied to a new data sample outside the test data set.

2. The method as in claim 1, wherein the first insole and the second insole constitute a pair of insoles adapted to be worn by a single user.

3. The method as in claim 1, wherein the filtering comprises at least one of: low-pass filtering, Gaussian filtering, moving average filtering, smoothing, rejection of outlier data points, interpolation, frequency, domain transformation, and dimension reduction.

4. The method as in claim 1, wherein the evolutionary algorithm is one of: a genetic algorithm, a particle swarm optimization algorithm, and a differential evolution algorithm.

5. The method as in claim 1, wherein the plurality of sensors comprise at least one of force sensors and pressure sensors.

6. The method as in claim 1, wherein the plurality of sensors are embedded in one or more regions of the one or more insoles, and wherein each region of the one or more insoles in adapted to contact a region of a foot of a user.

7. The method as in claim 1, wherein the data collected from the plurality of sensors embedded in the one or more insoles is transmitted wirelessly to the processor.

8. A system for fitness tracking, comprising:
one or more insoles, the one or more insoles having embedded therein a plurality of sensors;
a computer having a processor and memory; and
one or more code sets stored in the memory and executing by the processor, which, when executed, configure the processor to:
receive, as inputs, data collected from the plurality of sensors embedded in the one or more insoles;
filter the data;
execute an evolutionary algorithm on the data, wherein the evolutionary algorithm converges the data from the plurality of sensors;
determine, based on the converged data, a total weight applied to the one or more insoles;
generate a test data set based on one or more samples of the data from a first set of the plurality of sensors, wherein the first set of the plurality of sensors are embedded in a first insole of the one or more insoles;
associate a known weight quantity to a second set of the plurality of sensors;
wherein the second set of the plurality of sensors are embedded in a second insole of the one or more insoles;
apply a fitness function to the test data and the known weight quantity; and
determine, based on the fitness function, whether or not the evolutionary algorithm has optimally converged, such that a predicted weight can be applied to a new data sample outside the test data set.

9. The system as in claim 8, wherein the first insole and the second insole constitute a pair of insoles adapted to be worn by a single user.

10. The system as in claim 8, wherein the filtering comprises at least one of: low-pass filtering, Gaussian filtering, moving average filtering, smoothing, rejection of outlier data points, interpolation, frequency, domain transformation, and dimension reduction.

11. The system as in claim 8, wherein the evolutionary algorithm is one of: a genetic algorithm, a particle swarm optimization algorithm, and a differential evolution algorithm.

12. The system as in claim 8, wherein the plurality of sensors comprises at least one of force sensors and pressure sensors.

13. The system as in claim 8, wherein the plurality of sensors is embedded in one or more regions of the one or more insoles, and wherein each region of the one or more insoles in adapted to contact a region of a foot of a user.

14. The system as in claim 8, wherein the data collected from the plurality of sensors embedded in the one or more insoles is transmitted wirelessly to the processor.

15. A device for fitness tracking, comprising:
one or more insoles, the one or more insoles having embedded therein a plurality of sensors and wireless data transmitter, the one or more insoles configured to collect data and wireless transmit the data to a computer having a processor, memory, and one or more code sets stored in the memory and executing by the processor, which, when executed, configure the processor to:
receive, as inputs, the data collected from the plurality of sensors embedded in the one or more insoles;
filter the data;
execute an evolutionary algorithm on the data, wherein the evolutionary algorithm converges the data from the plurality of sensors;
determine, based on the converged data, a total weight applied to the one or more insoles;
generate a test data set based on one or more samples of the data from a first set of the plurality of sensors, wherein the first set of the plurality of sensors are embedded in a first insole of the one or more insoles;
associate a known weight quantity to a second set of the plurality of sensors; wherein the second set of the plurality of sensors are embedded in a second insole of the one or more insoles;
apply a fitness function to the test data and the known weight quantity; and
determine, based on the fitness function, whether or not the evolutionary algorithm has optimally converged, such that a predicted weight can be applied to a new data sample outside the test data set.

16. The device as in claim 15, wherein the first insole and the second insole constitute a pair of insoles adapted to be worn by a single user.

17. The device as in claim 15, wherein the evolutionary algorithm is one of: a genetic algorithm, a particle swarm optimization algorithm, and a differential evolution algorithm.

* * * * *